United States Patent
Störmer

(10) Patent No.: US 10,703,200 B2
(45) Date of Patent: Jul. 7, 2020

(54) DRIVE DEVICE FOR A MOTOR VEHICLE AND MOTOR VEHICLE

(71) Applicant: AUDI AG, Ingolstadt (DE)

(72) Inventor: Markus Störmer, Berching (DE)

(73) Assignee: AUDI AG, Ingolstadt (DE)

(*) Notice: Subject to any disclaimer, the term of this patent is extended or adjusted under 35 U.S.C. 154(b) by 367 days.

(21) Appl. No.: 15/542,666

(22) PCT Filed: Nov. 26, 2015

(86) PCT No.: PCT/EP2015/002376
§ 371 (c)(1),
(2) Date: Nov. 15, 2017

(87) PCT Pub. No.: WO2016/112934
PCT Pub. Date: Jul. 21, 2016

(65) Prior Publication Data
US 2018/0147938 A1 May 31, 2018

(30) Foreign Application Priority Data
Jan. 15, 2015 (DE) .................... 10 2015 000 466

(51) Int. Cl.
*B60K 5/08* (2006.01)
*B60K 17/34* (2006.01)
(Continued)

(52) U.S. Cl.
CPC ............... *B60K 17/34* (2013.01); *B60K 5/08* (2013.01); *B60K 6/24* (2013.01); *B60K 6/365* (2013.01);
(Continued)

(58) Field of Classification Search
CPC . B60K 5/08; B60K 6/365; B60K 6/48; B60K 6/24; B60K 6/387; B60K 23/0808;
(Continued)

(56) References Cited

U.S. PATENT DOCUMENTS 6,295,487 B1* 9/2001 Ono .................... B60K 6/44
701/22
6,306,056 B1 10/2001 Moore
(Continued)

FOREIGN PATENT DOCUMENTS

CN      101450619 A     6/2009
CN      103818231 A     5/2014
(Continued)

OTHER PUBLICATIONS

Chinese Office Action dated Dec. 5, 2018, in connection with corresponding CN Application No. 201580073470.3 (10 pgs., including machine-generated English translation).
(Continued)

Primary Examiner — Patrick H Mackey
(74) Attorney, Agent, or Firm — Maier & Maier, PLLC

(57) ABSTRACT

A drive apparatus for a motor vehicle, including a first motor drive device with at least one rotatable drive element and at least one other motor drive device with at least one rotatable drive element, at least one drive device that can be coupled to at least one drive axle on the vehicle side, with at least one rotatable drive element, at least one first motor drive device and with at least one other motor drive device and a gear device with at least one rotatable element that is or can be coupled to the drive device.

13 Claims, 9 Drawing Sheets

(51) Int. Cl.

| | | |
|---|---|---|
| *B60K 6/365* | (2007.10) | |
| *B60K 17/08* | (2006.01) | |
| *B60K 23/08* | (2006.01) | |
| *B60K 6/48* | (2007.10) | |
| *B60K 6/24* | (2007.10) | |
| *B60W 20/10* | (2016.01) | |
| *B60W 50/00* | (2006.01) | |
| *B60K 6/387* | (2007.10) | |
| *B60W 20/40* | (2016.01) | |
| *F16H 37/08* | (2006.01) | |

(52) U.S. Cl.
 CPC ............ *B60K 6/387* (2013.01); *B60K 6/48* (2013.01); *B60K 17/08* (2013.01); *B60K 23/08* (2013.01); *B60K 23/0808* (2013.01); *B60W 20/10* (2013.01); *B60W 20/40* (2013.01); *B60W 50/0097* (2013.01); *F16H 37/0806* (2013.01); *B60K 2006/4825* (2013.01); *B60Y 2200/92* (2013.01); *Y02T 10/6221* (2013.01); *Y02T 10/6252* (2013.01); *Y02T 10/6265* (2013.01); *Y02T 10/6295* (2013.01); *Y10S 903/905* (2013.01); *Y10S 903/906* (2013.01)

(58) Field of Classification Search
 CPC ... B60W 20/10; B60W 50/0097; B60W 20/40
 See application file for complete search history.

(56) References Cited

U.S. PATENT DOCUMENTS

| | | | | |
|---|---|---|---|---|
| 7,371,201 | B2* | 5/2008 | Usoro | B60K 6/365 |
| | | | | 180/65.7 |
| 7,422,534 | B2* | 9/2008 | Usoro | B60K 6/365 |
| | | | | 475/5 |
| 7,479,080 | B2* | 1/2009 | Usoro | B60K 6/365 |
| | | | | 180/65.25 |
| 7,625,307 | B2* | 12/2009 | Usoro | B60K 6/448 |
| | | | | 475/5 |
| 8,307,924 | B2* | 11/2012 | Wang | B60L 50/61 |
| | | | | 180/65.23 |
| 8,335,603 | B2* | 12/2012 | Mitsutani | B60L 50/16 |
| | | | | 701/22 |
| 8,337,359 | B2 | 12/2012 | Hofbauer | |
| 8,670,887 | B2* | 3/2014 | Nishimori | B60W 20/40 |
| | | | | 180/6.48 |
| 2007/0095587 | A1* | 5/2007 | DuCharme | B60K 6/12 |
| | | | | 180/65.31 |
| 2007/0151783 | A1 | 7/2007 | Yamauchi | |
| 2013/0090207 | A1 | 4/2013 | Ichikawa et al. | |
| 2015/0006065 | A1* | 1/2015 | Yamamoto | B60K 6/445 |
| | | | | 701/113 |
| 2015/0211607 | A1* | 7/2015 | Nakashima | F16H 3/089 |
| | | | | 74/661 |

FOREIGN PATENT DOCUMENTS

| | | |
|---|---|---|
| CN | 103818238 A | 5/2014 |
| CN | 103863091 A | 6/2014 |
| CN | 104220315 A | 12/2014 |
| DE | 19839231 A1 * | 3/2000 |
| DE | 19839231 A1 | 3/2000 |
| DE | 10001436 A1 | 8/2000 |
| DE | 102004018395 A1 | 11/2005 |
| DE | 69834683 T2 | 7/2007 |
| DE | 102007005530 A1 | 11/2007 |
| DE | 102012213148 A1 | 1/2014 |
| DE | 102013221911 A1 * | 5/2014 |
| DE | 102013221911 A1 | 5/2014 |
| DE | 102013221912 A1 | 5/2014 |
| DE | 102013221912 A1 * | 5/2014 |
| EP | 1731346 B1 | 8/2009 |
| WO | 2009069361 A1 | 6/2009 |

OTHER PUBLICATIONS

Examination Report dated Sep. 2, 2015 of corresponding German application No. 102015000466.2; 6 pgs.
International Search Report dated Mar. 7, 2016 of corresponding International application No. PCT/EP2015/002376; 16 pgs.
Notification of Transmittal of Translation of the International Preliminary Report on Patentability dated Jul. 27, 2017, in connection with corresponding international application No. PCT/EP2015/002376 (10 pgs.).

* cited by examiner

DRIVE DEVICE FOR A MOTOR VEHICLE AND MOTOR VEHICLE

FIELD

Exemplary Embodiments

The invention relates to a drive apparatus for a motor vehicle.

BACKGROUND

Such drive apparatuses are generally essential components of the drivetrain of a motor vehicle. Modern drive apparatuses can comprise several motor drive device. So for example, drive apparatuses provided with two different motor drive devices are known. In particular, the combination of a first motor drive device in the form of an internal combustion engine that is provided with at least one other motor drive device in the form of an electric motor is known. This principle of corresponding drive apparatuses is realized in so called hybrid motor vehicles.

In view of a particularly energy-efficient and thus also consumption-efficient operating manner of a motor vehicle comprising a drive apparatus equipped with different motor drive devices, it is desirable when the respective motor drive device are operated as often as possible, in particular constantly, at each efficiency level that is specific to the drive device with the optimum efficiency of the torque and/or of the output characteristic curve range.

As far as multiple possible combinations are concerned, in particular with different motor drive devices, there is a constant need for further development of corresponding drive devices to make it possible to operate respective motor drive devices constantly at respective efficiency levels that are optimal for the torques and/or the performance characteristic ranges of the drive devices.

SUMMARY

The objective of the invention is to provide a better drive apparatus for a motor vehicle.

This objective is achieved by a drive apparatus for a motor vehicle, which is characterized in that it is provided with:
- a first motor drive device having at least one rotatable drive element and at least one other motor device provided with a rotatable drive element,
- at least one output device that is or can be coupled to a driving device with at least one rotatable element of a drive axle on the drive side of a motor vehicle,
- at least one first motor drive device and/or at least one other motor drive device and/or at least one rotatable gear device that is or can be coupled with the drive device
- at least one coupling and/or decoupling device, which can be switched to different coupling and/or decoupling states, wherein the coupling device comprises:

at least one gear device for coupling and decoupling of the at least one rotatable output element of the at least one other motor drive device with the or with at least one rotatable gear element, and/or
which is designed for coupling and/or decoupling of the at least one rotatable gear element of the at least one transmission device with at least on output element of the drive device.

The drive apparatus described here includes a first motor drive device and at least one other motor drive device. The drive device thus includes at least two motor drive devices (hereinafter referred to simply as drive devices). The at least two drive devices are typically different in their respective drive device specific torques and/or performance curves, in particular in their respective drive device specific curve ranges. At the same time, the respective drive devices-specific torque and/or performance curves of the respective drive devices must not differ over the entire rotational speed range of respective drive devices; the or a first drive device and the or at least one other drive device can have a certain different rotational speed range or interval, in particular they can have rotational speed-dependent torques and/or performance curves.

Drive apparatuses comprising drive devices can in particular consist of a combination of different internal combustion engines, different in particular with respect to their torque and/or output curves, and/or electric motors. Accordingly, the or a first drive device can be for example designed as an internal combustion engine or it can comprise such an engine, which contains at least one other drive device that can be also designed as an internal combustion engine or it can comprise such an engine. In this case, internal combustion engines are typically provided with different torques and performance curves. As an alternative, the or a first drive device can be designed as an internal combustion engine, or it can comprise such an engine, which can comprise at least one other drive device that can be designed as an electric motor, or include such a motor. It goes without saying that a reverse configuration is also possible. According to another alternative, the or a first drive device can be designed as an electric motor or it can include such a motor, which is also designed as an electromotor or at least includes such a motor. In this case, electric motors having different torque and/or performance curves are typically provided. It should be noted that the drive apparatus can in principal have any number of drive devices that can be combined with each other arbitrarily as required, which is to say internal combustion engines and/or electric motors.

As long as the drive apparatus includes several internal combustion engines, a first drive device that is detected as an internal combustion engine or includes such an engine comprising other drive device, typically has, as was mentioned, different torques and performance curves. This can be realized for example so that the first internal combustion engine which forms the first drive device and an internal combustion engine which forms at least one other drive device have the same or a different number of cylinders and/or the same or a different stroke ratio and/or bore ratio. Therefore, the first internal combustion engine forming or comprising the first drive device and a or at least one other internal combustion engine forming at least one other drive device can be provided with for example with the same number of cylinders having different stroke and/or bore ratio, or with a different number of cylinders having the same stroke and/or bore ratio, or a different number of cylinders with a different number of stroke and/or bore ratios.

As will become evident later, an internal combustion engine can be also a part of an internal combustion engine or a superordinate internal combustion engine unit. Such an internal combustion engine unit is typically formed from at least two internal combustion engine parts, which can be typically operated independently of each other, or it can at least include internal combustion engine parts, which can be typically operated independently of each other. In other words, a or the first drive device forming an internal combustion engine, or being formed by it, and a or the at least one other device forming another internal combustion engine or being formed by it, can include another internal combustion engine including respectively an internal combustion engine part comprising at least another combustion engine of a combustion engine unit comprising at least two internal combustion engine parts.

An internal combustion engine can therefore also be an internal combustion engine part provided with a certain number of cylinders having a certain stroke and/or bore ratio of an internal combustion engine unit comprising a plurality of internal combustion engine parts.

An example of an embodiment of a corresponding internal combustion engine provided with a total of four cylinders can be formed for example by a first internal combustion engine part having a first stroke and/or bore ratio, and another drive device, formed for example with two cylinders and with a different stroke and/or bore ratio from the first one, in particular so that it is formed with a second internal combustion engine part having a greater stroke and/or bore ratio. Also in this context, any possible combinations of different numbers of cylinders are in principle possible, and/or also different stroke and/or bore ratios are also conceivable for forming a first drive device and at least one other drive device.

The respective drive devices comprise in each case at least one rotatable drive element. Such a drive element is typically a drive shaft for transmitting a drive torque to a coupling partner that is coupled or can be coupled with the respective drive device or the respective drive element. Corresponding drive elements can themselves also be regarded as coupling partners.

In addition to the at least two drive devices, the drive apparatus described here comprises at least one output device that is coupled or can be coupled directly or indirectly with the interposition of at least one structural unit, for example in the form of a transmission device on the side of the motor vehicle, for transmitting rotational speed, torques, etc., with a drive axle, which is to say a drivable front or rear axle, to a motor vehicle equipped with the drive apparatus.

The output device comprises at least one rotatable output element. Such an output element is typically an output shaft for transmitting an output torque to a coupling partner that is coupled or can be coupled with to an output device, in particular to an output device that is coupled or can be coupled to an output axle on the vehicle-side. A corresponding output element itself can be also considered as a coupling partner.

The output device comprises further at least one drive device, i.e. in particular at least one rotatable drive element coupled to the or to a first drive device, and/or to the or a at least one first drive device, and/or to the or at least one other drive device, i.e. in particular at least one rotatable drive element of the at least one other drive device, and/or to at least one output device, i.e. in particular one rotatable output element of the at least one output element of a coupled transmission device, or a transmission device that can be coupled. The transmission device comprises at least one rotatable gear element. Such a gear element is for example a transmission shaft, a gear wheel, etc., for transmission of a torque to another gear element and/or a coupling partner that is coupled or can be coupled to the transmission device. A corresponding gear element itself can be also regarded as a coupling partner.

The drive apparatus also comprises at least one coupling device which can be switched between different coupling or decoupling states. At least two coupling partners are mutually coupled to each other on the side of the drive device in respective coupling states. Such a coupling enables a connection for transmitting a torque of respective coupling partners. In each of the decoupling states, at least two coupling partners are not mutually coupled to each other on the side of the drive device. Such a decoupling makes it possible that no torque transmitting connection is created between respective coupling partner. The switching of the coupling partners to respective coupling or decoupling states, wherein with respect to the plurality of different coupling possibilities, respective coupling partners can be realized so that at least in one coupling state at least two coupling partners can be parallel to at least one decoupling state of at least two coupling partners, which is typically carried out with a switching device that is assigned or can be assigned via a coupling device element. Such a switching device can also form a component part of the drive device.

It is essential that at least one coupling device allows all coupling partners of the drive device to couple to or decouple from each other as desired or as required in corresponding coupling states or decoupling states. The coupling device is thus in particular equipped for coupling and/or decoupling of the or at least one rotatable drive element of the first drive device with the or at least one rotatable gear element of the at least one transmission device, and/or for coupling and decoupling of the or at least one rotatable gear element of the at least one transmission device with at least one rotatable output element of the output device. In generally, the coupling device is designed to couple any coupling partner of the drive apparatus with at least one other coupling partner of the drive apparatus, or to decouple any coupling partner of the drive apparatus from at least one other coupling partner of the drive apparatus.

The use of the described possibilities for coupling or decoupling of respective coupling partners makes it possible to operate a motor vehicle equipped with the drive apparatus particularly efficiently with respect to consumption and energy efficiency. This is due to the fact that respective drive devices can be operated with targeted coupling or decoupling devices in respecting operating situations in particular driving situations of a motor vehicle that is equipped with the drive apparatus at each optimized drive device-specific efficiency level or in an optimized characterized curve, without any losses with respect to respective operating situations, in particular driving situations. In this context, it should be also understood that in certain operating situations, in particular driving situations, it can be expedient when only several specified drive devices are operated in order to operate a motor vehicle that is equipped with the drive apparatus in a particularly energy-efficient or consumption-efficient manner. In principle, it is not necessarily required that all of the drive devices belonging to the drive apparatus should be operated at the same time.

Different torques or load paths can be formed with the respective coupling devices. In this context it is essential that individual, multiple, or all rotatable gear elements can be maintained in a fixed position as required, i.e. that they can be transferred to a non-rotatable state. Similarly to an automatic transmission, each rotatable gear element can be held in a fixed position when required.

Overall, therefore, with respect to different operating modes or types, generally different loading situations, optimal branching of respective drive devices, drive capabilities that can be or are made available and thus a maximum variability of the drivetrain can be implement with a motor vehicle that is provided with the drive apparatus.

In an example of a travel at a constant first speed or acceleration can be used a drive line provided or to be provided via a drive apparatus with a first combination of different drive devices and/or a first combination of different drive devices with different gear elements realized in such a way that at least one, or if appropriate all drive devices are operated at each optimal efficiency level or optimized curve. For a trip with a second constant speed that is different from the first constant speed or acceleration, the drive line that is provided or that is to be provided can thus be implemented for this purpose in general via a second combination of different drive devices and/or a second combination of different drive apparatuses with different gear elements in such a way that at least one, or if appropriate all drive devices are operating in each efficiency-optimal or optimized characteristic curve.

The aforementioned or corresponding switching device for switching the at least one coupling device into different coupling and decoupling states is thus in particular adapted to couple the respective drive devices via at least one transmission to the or at least one drive device that the respective drive devices can be operated, with regard to at least one of them as a function of an actual or future operating mode or type, generally a current or future load situation, based on a target variable determined by a motor vehicle equipped with the drive device, in particular a target speed or target acceleration, so that it can be operated or they can be operated at each drive device-specific optimal efficiency level target and/or in the performance curve region.

Under the term operating mode or type should be understood a mode of operation of a motor vehicle equipped with a drive apparatus, for example a driver-dependent operating mode, which the driver determines or influences for example by driver-induced acceleration processes of the motor vehicle (such as "accelerate"). Under the operating mode or type of a motor vehicle equipped with the drive apparatus can be understood for example also a setting-dependent operating mode or type of a motor vehicle equipped with a drive apparatus, wherein the driver can for example determine or influence based on previous settings for example the acceleration processes of the motor vehicle. This should be understood for example as so called dynamic or sport mode in which corresponding drive devices are operated according to a particularly dynamic or sport-like driving style, i.e. typically a driving style at a high rotational speed.

It goes without saying that the switching device receives or processes the corresponding coupling or decoupling target variables for switching on the coupling device in conjunction with the current or future operating mode or type of a motor vehicle that is equipped with the drive apparatus. The switching device can be equipped for this purpose with control devices generating the corresponding target variables, for example by means of a databus on the side of the motor vehicle. The issuing of the corresponding target variables is carried out typically by means of algorithms that are stored in the corresponding control devices on the side of the motor vehicle, which generate target variables of operating parameters based on diverse operating parameters, in particular operating parameters suitable for a motor vehicle equipped with control devices on the side of the motor vehicle. The drive apparatus can thus comprise at least one control device for controlling the operation of the switching device and thus the coupling or decoupling of the at least one coupling device with the respective coupling partners.

It was already mentioned that the first internal combustion engine forming or comprised by a first drive device and the at least one other internal combustion engine forming or comprised by another drive device can form an internal combustion engine unit comprising two internal combustion engine parts. In this case, in particular in view of a compact construction of the drive apparatus or of the internal combustion engine unit, it is expedient when the first internal combustion engine (part) comprised by or forming the first drive device or devices, and one other internal combustion engine (part) comprised by or forming at least one other drive device are arranged or can be arranged together with a cylinder head enclosed in a combustion chamber of the internal combustion unit. Drive devices forming the respective internal combustion engine parts can be arranged in a housing, in particular in the cylinder crankcase, of the internal combustion engine unit.

The or at least one corresponding transmission device can be designed for example as a single-stage or as a multi-stage planetary gear or the like. A corresponding planetary gear comprises as rotatable gear elements at least on sun wheel, at least one planetary carrier with a number of planetary wheels and at least one ring wheel. Multi-stage planetary gears can comprise several sun wheels and/or several planetary carriers and/or several ring wheels.

The at least one coupling device is expediently designed in conjunction with at least one transmission device that is designed as a single-stage or multi-stage planetary gear, or as comprising such a gear, so that at least one drive element of the or of the first drive device is coupling with the or at least one sun wheel or with the or at least one planetary carrier or with the or at least one ring wheel of the planetary gear, or decoupling from the or at least one sun wheel or the or at least one planetary carrier or the or at least one ring wheel of the planetary gear.

The at least one coupling device is further also expediently designed in conjunction with a transmission device designed as a single-stage or multi-stage planetary gear or as comprising such a gear so that at least one drive element of the at least one other drive device is coupling with the or with at least one sun wheel or with the or with at least one planetary carrier or with the or with at least one ring wheel of the planetary carrier, or decoupling from the at least one sun wheel or from the at least one planetary carrier or from the at least one ring wheel.

The at least one coupling device is expediently adapted in conjunction with one transmission device designed as a single-stage or multi-stage gear or comprising such a gear to be coupled to at least one drive element of the or of at least one drive device with at least one sun wheel or at least one planetary carrier or at least one ring wheel, or to be decoupled from the at least one sun wheel of the or at least one planetary carrier or the at least one ring wheel of the planetary gear.

The at least one transmission device or at least one, optionally another transmission device, can be alternatively formed as a continuous gear or as a differential gear, or alternatively or additionally, it can comprise at least one continuous gear or at least one differential gear. In connection with continuous gears, in respective differential gears or rotatable gear elements comprised in these, the preceding explanation are analogously applicable, namely those relating to the coupling or decoupling of respective drive device-side drive elements or drive device-side output element with respective rotatable gear element of the examples of embodiments of the or of a gear device designed as planetary gears.

In connection with the corresponding coupling devices, it should be mentioned that these may be specifically provided as claw or lamellar couplings, for example switchable by means of a corresponding switching device. Other coupling constructions are of course also possible.

Examples of embodiments of corresponding drive apparatuses are explained in more detail below, wherein each comprises at least three drive devices:

For example, a first example of an embodiment of a drive device is provided with three drive devices, one transmission device, at least one output device that can be driven on the side of the motor vehicle and is equipped with one output device coupled to or decoupled from the front or rear axle and several coupling devices. This embodiment is provided for a motor vehicle that has one front axle or rear axle drive, or a rear axle or rear drive.

The first drive device is for example a first internal combustion engine, the second drive device is for example a second internal combustion engine and the third drive device is for example an electric motor. Both internal combustion engines are typically provided with different characteristic curves. The respective drive devices may, as was already mentioned, respectively include several drive elements.

According to the first embodiment, a first coupling device is configured for coupling at least one drive element of a first drive device with at least one drive element and a third drive device, and for decoupling of at least one drive element of the first drive device from at least one drive element of the third drive device. The first coupling device element is typically connected between the third drive device, i.e. in particular an electric engine, and depending on the point of view, the first or the second drive device, i.e. in particular a first or a second internal combustion engine.

A second coupling device is configured for coupling at least one drive element of a second drive device to at least one drive element of the first drive device and/or of the third drive device and for decoupling at least one drive element of the second drive device of at least one drive element of the first drive device and/or of the third drive device. The second coupling device is typically connected between the third drive device, i.e. in particular an electric motor, and depending on the point of view, the first or the second drive device, i.e. a first or a second internal combustion engine.

A third coupling devices is provided for coupling a third coupling element of a third coupling device coupled to at least one drive element of the first drive device and/or of the second drive device and/or of the third drive device coupled to at least one coupling element of the fourth coupling device connected upstream on the side of the drive of the transmission device, and for decoupling the fourth coupling device coupled with at least one drive element of the first drive device and/or of the second drive device and/or the third coupling device from at least one coupling element connected upstream on the side of the drive. The third coupling device is typically connected between the first and the second drive device, i.e. in particular between a first or a second internal combustion engine, and a fourth coupling device connected upstream on the side of the drive of the transmission device.

The or a fourth coupling device connected on the side of the drive of the transmission device is coupled to at least one rotatable gear element, which is coupled to at least one drive element of the first drive device and/or of the second drive device and/or of the third drive device coupled to the coupling element of the fourth coupling device with at least one rotatable element of the transmission device on the drive side, and for decoupling of a coupling element of the first drive device with at least one drive element and/or of the second drive device and/or of the third drive device coupled with the third coupling element of the third coupling device to the fourth coupling device of at least one rotatable gear element of the transmission device on the drive side. The fourth coupling device is typically connected between the third coupling device and the transmission device.

A fifth coupling device is provided for coupling at least one output side rotatable gear element of the transmission device to at least one drive element of the output device, which can be coupled to a drive device that is or can be coupled to the front or rear axle, and for decoupling of at least one output side rotatable gear element of the transmission device from at least one output element of the output device that is or can be coupled to a vehicle-side drivable front or rear axis, The fifth coupling device is typically connected between the transmission device and the output device.

With a corresponding arrangement and configuration of the five coupling devices in this first embodiment of the drive device, any required combination of all of the rotatable drives and drive elements with all of the drive elements and thus also the maximum variability in the drivetrain of a motor vehicle equipped with the drive apparatus can be realized.

A second embodiment example of a drive device also comprises three drive devices, but not just one, but at least two transmission devices that are or can be coupled to a front axle drivable on the motor vehicle side, or drive devices that can be coupled to a rear axle drivable on the side of the motor vehicle and several coupling devices. This embodiment is provided for a motor vehicle with one front axle or front drive and/or with a rear axle or rear drive. Such a motor vehicle can thus be driven either via the front axle or via the rear axle, or—as is the case with all-wheel drive vehicles—both via the front and the rear axle.

Also in this case, the first drive device can be for example an internal combustion engine, the second drive device can be for example a second internal combustion engine, and the third drive device can be for example an electric engine. Both internal combustion engines are typically provided with different characteristic curves. The respective drive device may comprise several drive elements as was already mentioned.

A first coupling device is adapted for coupling at least one drive element of a first drive device to at least one drive element of a second drive device and/or a third drive device, and for decoupling at least a drive element of the first drive device from at least one drive element of the second drive device and/or of the third drive device. The first coupling device is typically connected between the third drive device, i.e. an electric motor, and the first drive device, i.e. a first combustion engine.

A second coupling device adapted for coupling a coupling element of the first drive device is coupled with at least one drive element and/or the second drive device and/or the third drive element to a third coupling device with at least one coupling element of a first drive device connected upstream on the drive side, and for decoupling of a coupling device of the second device coupled with at least one drive element of the first drive device and/or the second drive device and/or the third drive device from at least one coupling element of a third coupling device connected upstream on the drive side. The second coupling device is typically arranged between the first drive device, i.e. a first combustion engine, and a third coupling device connected upstream on the drive side of the first transmission device.

The or a third coupling device connected upstream on the drive side of the first transmission device is adapted for coupling a coupling element of the second coupling device coupled to at least one drive element of the first drive device and/or the second drive device and/or the third device coupled to the second coupling element of the third coupling device to at least one rotatable gear element on the drive side of the transmission device, and for decoupling of the coupling element of the third coupling element coupling to at least one drive element of the first drive device and/or the second drive device and/or the third drive device from at least one gear element of the first transmission device rotatable on the drive side. The third coupling device is typically connected between a coupling element of the second coupling device coupled to at least one drive element of the first drive device and/or the second drive device and/or the third drive device and the first transmission device, i.e. at least one rotatable gear element on the drive side of the first transmission device.

A fourth coupling device is provided for coupling at least one output-side rotatable gear element of the first transmission device to at least one output element of the output device that is or can coupled with the vehicle-side drivable front axle and for decoupling at least one output-side rotatable gear element of the first transmission device of the at least one output element that is or can be coupled to an output device of a vehicle-side drivable front axle. The fourth coupling device is typically connected between the first transmission device, i.e. at least one output-side rotatable gear element of the first transmission device, and the output device that is or can be coupled to the drivable front axle, i.e. a rotatable output element on the drive side to the output device that is or can be coupled to the front axle.

As will become apparent from the following, the arrangement and the configuration of the component parts belonging to the drive apparatus, i.e. in particular the coupling device, may be symmetrical with respect to the third drive device.

A fifth coupling device is configured for coupling at least one drive element of the second drive device to at least one drive element of the first drive device and/or of the third drive device, and for decoupling at least one drive element of the second drive device from at least one drive element of the first drive device and/or the third drive device. The fifth coupling device is typically connected between the third drive device, i.e. an electric motor, and the second drive device, i.e. a second internal combustion engine. The fifth coupling device and the first coupling device are arranged symmetrically with respect to the third drive device.

A sixth coupling device is adapted for coupling of the fifth coupling device coupled to at least one drive element of the first driving device and/or the second drive device and/or the third drive device to at least one coupling element of a seventh coupling device arranged upstream of a second transmission device, and for decoupling the seventh coupling device with at least one drive element of the first drive device and/or the second drive device and/or the third drive device coupled upstream to at least one coupling element of the second drive device on the drive side. The sixth coupling device is typically connected between the second drive device, i.e. a second internal combustion engine, and a seventh coupling device of the transmission device coupled on the drive side. The sixth coupling device and the second coupling device are arranged symmetrically with respect to the third drive device.

The or a seventh coupling device of the sixth transmission device connected on the drive side is adapted for coupling a coupling element, which is coupled to at least one drive element of the first drive device and/or the second drive device and/or the third coupling element of the sixth coupling device coupled to the seventh coupling device with at least one drive-side rotatable gear element of the second transmission device, and for decoupling the coupling element of the seventh coupling element of the sixth coupling device coupled to at least one drive element of the first drive device and/or the second drive device and/or the third drive device from at least one drive-side rotatable gear element of the transmission device. The seventh coupling device is typically connected between the coupling element of the sixth coupling device of the first drive device with a least one drive element and/or the second drive device and/or the third drive device, and the second drive device, i.e. at least one drive-side rotatable gear element of the second transmission device. The seventh coupling element and the third coupling element are arranged symmetrically with respect to the third drive device.

Finally, an eighth coupling device is adapted for coupling at least one rotatable gear element on the drive side of the second transmission device with at least one drive element of the output device that is or can be coupled to a drive-side drivable rear axle with at least one output element, and for decoupling at least one output-side rotatable gear element of the second transmission device from at least one output element of output device that is or can be coupled to the rear axle drivable on the drive-side of the motor vehicle.

The eighth coupling device is typically arranged between the second transmission device, i.e. a rotatable gear element on the output side of the second transmission device, and the output device that is or can be coupled to the drivable rear axle, i.e. an output element rotatable on the drive side, connected so that it is or can be coupled to the drivable rear axle. The eighth coupling device and the fourth coupling device are arranged symmetrically with respect to the third drive device.

With a corresponding arrangement and configuration of the coupling devices of the drive device in this second embodiment example, eight coupling devices can be realized with any of the combinations mentioned above as required and with all of the rotatable drive and output elements and all of the gear elements, so that the maximum variability mentioned above can be achieved in the drivetrain of a motor vehicle equipped with the drive apparatus.

In the corresponding coupling states of the coupling devices, a drive output can be applied via the first drive device and/or via the second drive device and/or via the third device, by means of individual, multiple or all drive devices to at least one drive axle on the side of the vehicle, i.e. a drivable front and/or rear axle. With regard to a particularly consumption-efficient operation mode or operation type, in particular in connection with the current or future target variables, in particular a current or future target speed or target acceleration of a vehicle equipped with the drive apparatus, a drive output can be thus transmitted under certain operating conditions, in particular driving conditions, via the first drive device, i.e. for example a first internal combustion engine, optionally in addition also via the third drive device, i.e. for example an electric motor, or via the second drive device, i.e. a second internal combustion engine, optionally in addition also via the third drive device, i.e. for example the electric motor, or via the first drive device, i.e. for example the first internal combustion engine, and the second drive device, i.e. for example the second internal combustion engine, and optionally in addition also via the third drive device, i.e. for example the electric motor, to a drivable front and/or rear axle.

The drive apparatus can further comprise a control device, which is configured to divide or distribute drive outputs, which can be obtained from the respective drive devices under certain coupling conditions determined on the side of the coupling device at least partially, to different drive axles of a motor vehicle equipped with the drive apparatus. It is thus possible to implement a corresponding division or distribution of the drive outputs that can be or are provided from the respective drive devices to one or to several drivable drive axles, i.e. in particular to a drivable front axle and/or a drivable rear axle, with a pure front or rear drive, or with a mixed front and rear drive that is provided for a specified division or distribution of the drive output to the front and rear axles of a motor vehicle equipped with the drive apparatus.

It is conceivable that at least one drive device is associated with a shift transmission comprising a plurality of shifting stages. In this case, the or a control device can be adapted to provide during a shift operation of a shift transmission device of a drive apparatus the drive power via this drive device with the shift operation via at least one other drive device. Smooth shifting can thus be realized in this manner; wherein the actual traction force applied via the connected drive device is provided during the shift operation of this drive device over time, i.e. in particular during the shifting operation, via at least one other drive device.

As long as at least two drive devices are designed as internal combustion engines or comprise such internal combustion engines, it is conceivable that the respective internal combustion engines may have internal combustion engine-specific auxiliary aggregate components, in particular starter devices, pump devices, i.e. for example water pumps, driving means, in particular belt drives, electric generators, i.e. for example alternators, turbo chargers or compressor devices that can be or are assigned to several internal combustion engines. The auxiliary aggregate components can thus be shared, which simplifies the overall configuration of the drive apparatus in an efficient manner.

It is in this case expedient when at least one freewheel device of the combustion engine crankshafts is arranged in the direction of a belt drive. With the rotation of the crankshaft, the corresponding auxiliary aggregate components are driven (along) via the crankshaft. With the rotation of several crankshafts, the auxiliary aggregate components are driven (along) via the relatively faster rotating crankshaft.

In the context of an auxiliary component in the form of a starter device for turning on or starting at least one internal combustion engine, at least one internal combustion engine can be provided on the side of a starter device with a starting element that is provided between at least two positions as a movable, in particular a pinion-like starter element. The starter element can cooperate in a first position with a flywheel of a first internal combustion engine, and in a second position it can generally cooperate with at least one other internal combustion engine. Several internal combustion engines can thus be turned on or started with a single starter device, which is to say via a single starter element.

The invention further relates to a motor vehicle comprising at least one drive apparatus as described above. All of the embodiments relating to the drive apparatus are analogously applicable also to the motor vehicle.

BRIEF DESCRIPTION OF THE FIGURES

Further advantages and details of the invention will become evident from the embodiments described below as well as from the drawings. The figures show the following.

DETAILED DESCRIPTION

Figure 1:
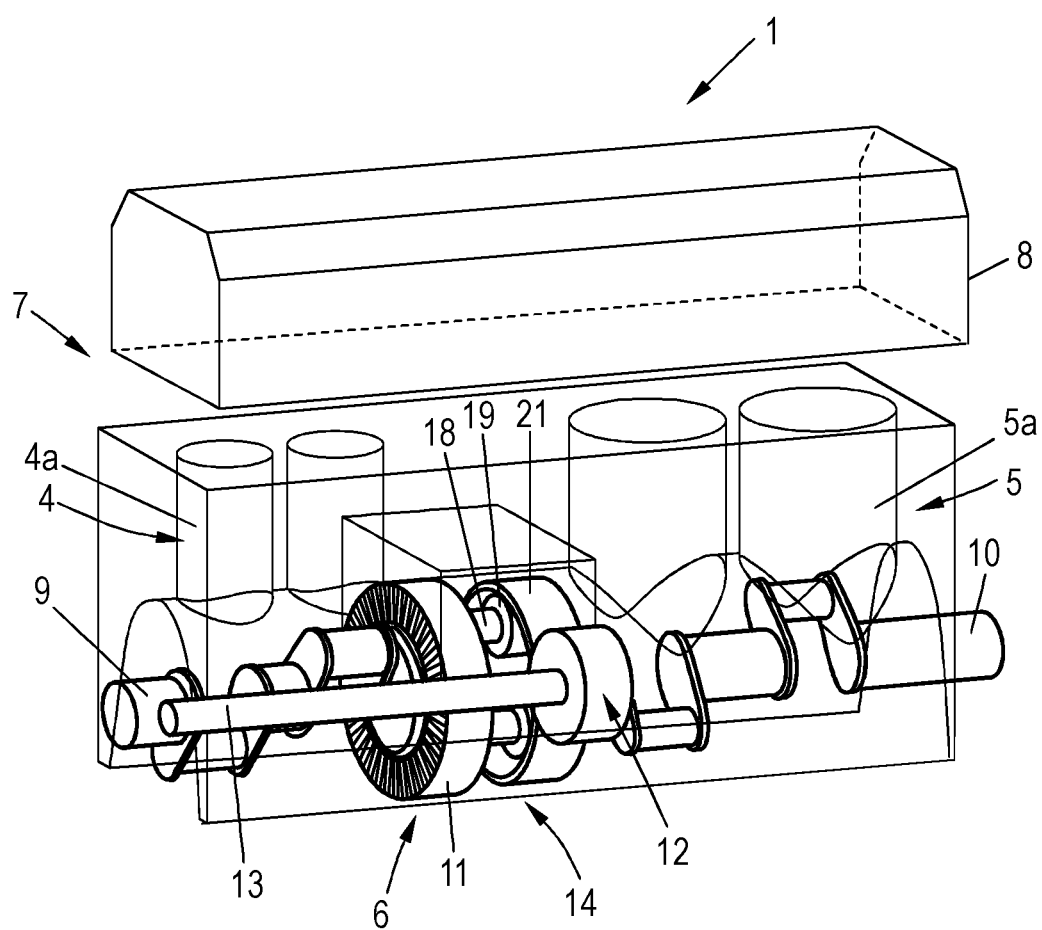
FIG. 1 a schematic representation of a drive apparatus according to an embodiment.

FIG. 1 shows a schematic representation of a drive apparatus 1 for a motor vehicle 2 (see FIG. 3-9) according to an embodiment. The drive device is in general used to generate a drive torque or a drive output and apply it to at least one drivable axle (see FIG. 3-9) of a motor vehicle 2 which is equipped with the drive apparatus 1.

The drive apparatus 1 comprises three motor drive device 4-6. A first drive device 4 is formed by a first internal combustion engine, a second internal combustion engine is formed by a second drive device 5, and an electric motor forms a third drive device 6 connected with the first and the second drive devices 4, 5 between both internal combustion engines.

The internal combustion engines formed by the first and the second drive device 4, 5 are designed as internal combustion engine parts of an internal combustion engine unit 7. The internal combustion engine unit 7 comprises in the embodiment shown in FIG. 1 a total of four cylinders. Two cylinders 4a form the first internal combustion engine with a first stroke and/or bore ratio and thus the first drive device 4, two cylinders 5 a, are provided with a second stroke/and bore ratio that is greater in comparison to the first stroke and/or bore ratio for the second internal combustion engine thus form the second drive device 5. Both internal combustion engines and thus also the drive devices 4, 5 can be operated independently of each other.

As shown, the first drive part 4 forming the first internal combustion engine (part) and the second drive part 5 forming the second internal engine (part) are jointly assigned to a cylinder head 8 of the internal combustion engine unit 7, which encloses the combustion chamber of the internal combustion engine unit 7. In general, the drive devices 4, 5 forming the respective internal combustion engine parts can be arranged together in a housing, in particular in a cylinder crankcase housing of the internal combustion engine unit 7.

The respective drive units 4-6 comprise respectively at least one rotatable drive element 9-11. The drive element 9 belonging to the first drive device 4 is a crankshaft of the first internal combustion engine (part), the drive element 10 belonging to the second drive device 5 is a crankshaft of the second internal combustion engine (part), and the drive element 11 belonging to the third drive device 6 is the rotor of the electric motor.

The drive apparatus 1 further comprises an output device 12. The output device 12 is connected, directly or indirectly with the interposition of at least one structural unit, for example in the form of a vehicle-side transmission (not shown) for transmission of rotational speeds, torques, etc., to a drive axle, that is to say a drivable front or rear axle 3a, 3b which is coupled or can be coupled to the vehicle 2 equipped with the drive apparatus 1.

The output device 12 comprises a rotatable output element 13. The output element 13 belonging to the output device 12 is an output shaft.

Figure 2:
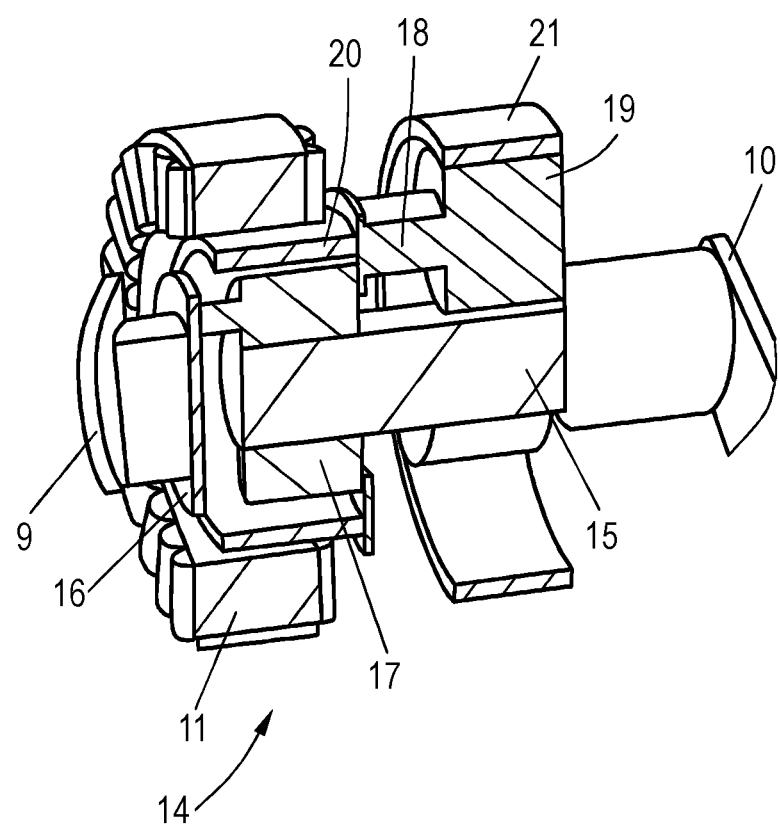
FIG. 2 a detailed view of detail II shown in FIG. 1.

The respective rotatable output elements 9-11, as well as the output element 13 are coupled or can be coupled to a transmission device 14 in the form of a multi-stage planetary gear provided with four possible shaft connections. As shown also in FIG. 2, the multi-stage planetary gear includes as rotatable gear elements in coaxial arrangement a sun wheel 15, a first planetary carrier 16 with a plurality of planetary wheels 17, a second planetary wheel 18 with a plurality of planetary wheels 19, a first ring wheel 20 and a second ring wheel 21. As one can see from FIG. 1 and FIG. 2, the first drive element 9 is or can be coupled to the first planetary carrier 16, the second drive element 10 is or can be coupled to the sun wheel 15, the third drive element 11 is or can be coupled to the first ring wheel 20, and the output element 13 is or can be coupled to the second ring wheel 21.

The coupling capability of each of the drive elements 9-11 as well as of the output elements 13 to the respective rotatable gear elements of the transmission device 14 is realized via at least one coupling device 22 (see FIGS. 3-9). Such a coupling device 22 can be for example a claw coupling or a lamellar coupling.

The coupling device 22 associated with the drive apparatus 1 can be switched by means of one or several switching devices (not shown) into different coupling or decoupling states. In respective coupling states, at least two coupling partners on the drive device side, i.e. output element 9-11, the drive elements 13 and the gear elements are coupled to each other. Such a coupling enables a torque transmitting connection of each coupled coupling partners. Accordingly, such a decoupling makes it possible to ensure that there is no torque transmitting connection between the respective coupling partners. In corresponding coupling circumstances or decoupling circumstances of the or of each coupling device 22, it is thus possible to couple the coupling partners of the drive apparatus to each other in any manner, or to decouple them from each other as required.

The coupling device 22 is thus adapted for coupling of at least one of any of the coupling partners on the drive device side or for decoupling from at least one of any of the coupling partners on the drive device side.

With any of the possibilities for coupling or decoupling of respective coupling partners it is thus possible to operate the motor vehicle 2 which is equipped with the drive apparatus 1 in a particularly energy-efficient and consumption-efficient manner. This is based on the fact that the respective drive devices 4-6 can be operated under targeted coupling and decoupling conditions of the coupling device 22 in respective operating situations, in particular driving situations, with optimal drive device-specific efficiency or in an optimized curve characteristic region without losses with respect to the respective operating situations, in particular driving situations. It should be also understood that in certain operating situations, in particular driving situations, it can be expedient to operate only one or only several specified drives in order to operate a vehicle 2 equipped with the drive apparatus 1 in a particularly energy-efficient or consumption-efficient manner. It is therefore in principle not necessary to operate all of the drive devices 4-6 at the same time.

Overall, while taking into account different operating modes or types and generally different load situations, an optimal branching of a motor vehicle 2 equipped with the drive apparatus 1 of the respective drive devices 4-6 that are provided or can be provided for driving performance, which can be realized with a maximum variability of the drivetrains of a motor vehicle 1 equipped with the drive apparatus 1.

A corresponding switching device connected to the coupling device 22 in different coupling and decoupling states is thus adapted to couple the respective drive device 5-6 via at least one transmission device 14 in such a way to the drive apparatus 12 that the respective drive devices 4-6 can be operated as a function of at least one of the current or future operating modes or types, generally according to the current or future load situation, based on a determined target variable of a motor vehicle 2 equipped with the drive apparatus 1, in particular a target speed or a target acceleration, with an optimal torque and/or in an output characteristic curve region that is specific to each drive device.

Under the term operation mode or operation type of a motor vehicle 2 equipped with a drive apparatus 1 should be understood for example a driver-determined operating mode or type of a motor vehicle 2 equipped with a drive apparatus 1, which the driver determines or influences for example with driver-induced acceleration processes of the motor vehicle 2 (accelerate). However, under an operating mode or type of a motor vehicle 2 equipped with the drive apparatus 1 can be also understood an operating mode or type that is determined by the settings of the motor vehicle 2 equipped with the drive apparatus 1, wherein the driver for example determines or influences the previously determined settings, such as for example the acceleration processes of the motor vehicle 2. This includes for example a so called dynamic or sport mode, in which corresponding drive devices 4-6 are operated according to a particularly dynamic or sport-like driving mode, i.e. typically a drive mode characterized by high rotational speeds.

It goes without saying that corresponding target variables are obtained or processed by the corresponding switching devices for switching respective coupling devices 22 into corresponding coupling or decoupling states in conjunction with a current or future operating mode or type of the motor vehicle 2 equipped with the drive apparatus 1. A corresponding switching device can for this purpose communicate via a database on the side of the motor vehicle with the control devices on the side of the motor vehicle generating the appropriate target variables (not shown).

The generation of the corresponding target devices is typically carried out via algorithms, which are stored in the control devices on the side of the motor vehicle and which are issued on the basis of various operating parameters, in particular based on the driving operation of a motor vehicle that is equipped with the drive apparatus 1.

In the case of the embodiments shown in the figures, wherein two drive devices 4, 5 are designed as internal combustion engines, it is conceivable that respective internal combustion engines can be or are jointly assigned to shared auxiliary aggregate components (not shown) that are specific to the internal combustion engines, i.e. in particular water pumps, driving means, in particular belt drives, electric generators, i.e. for example alternators, turbo chargers or compressor devices. In this manner, auxiliary aggregate components of several internal combustion engines can thus be shared, which simplifies in an efficient manner the overall configuration of the drive apparatus 1.

It is in this case expedient when at least one freewheel device (not shown) on the side of the internal combustion engine is provided on the respective crankshafts (see FIG. 1, 2, drive element 9, 10), arranged in the direction of a belt device. The corresponding auxiliary aggregate components are rotated (along) with the rotation of a crankshaft. With the rotation of several crankshafts, the auxiliary aggregate components are rotated (along) with the crankshaft, which is rotated faster in comparison.

In the context of an auxiliary aggregate component in the form of a starter device for used to turn on or start at least one internal combustion engine, an actor that is movable between at least two positions can be provided on the side of the starting device, in particular as a pinion-like starter element. The starter element can cooperate in a first position with a flywheel of the first internal combustion engine (part), and in a second position it can cooperated with a flywheel of the second internal combustion engine.

Both internal combustion engines can thus be turned on or started with a single starter device, i.e. via a single starter element.

In the following, embodiments of corresponding drive apparatuses 1 will be explained in more detail with reference to FIGS. 3-8. The drive apparatuses 1 shown in FIGS. 3-8 include the embodiments described as drive apparatuses 4-6 shown in the context of FIGS. 1 and 2.

Figure 3:
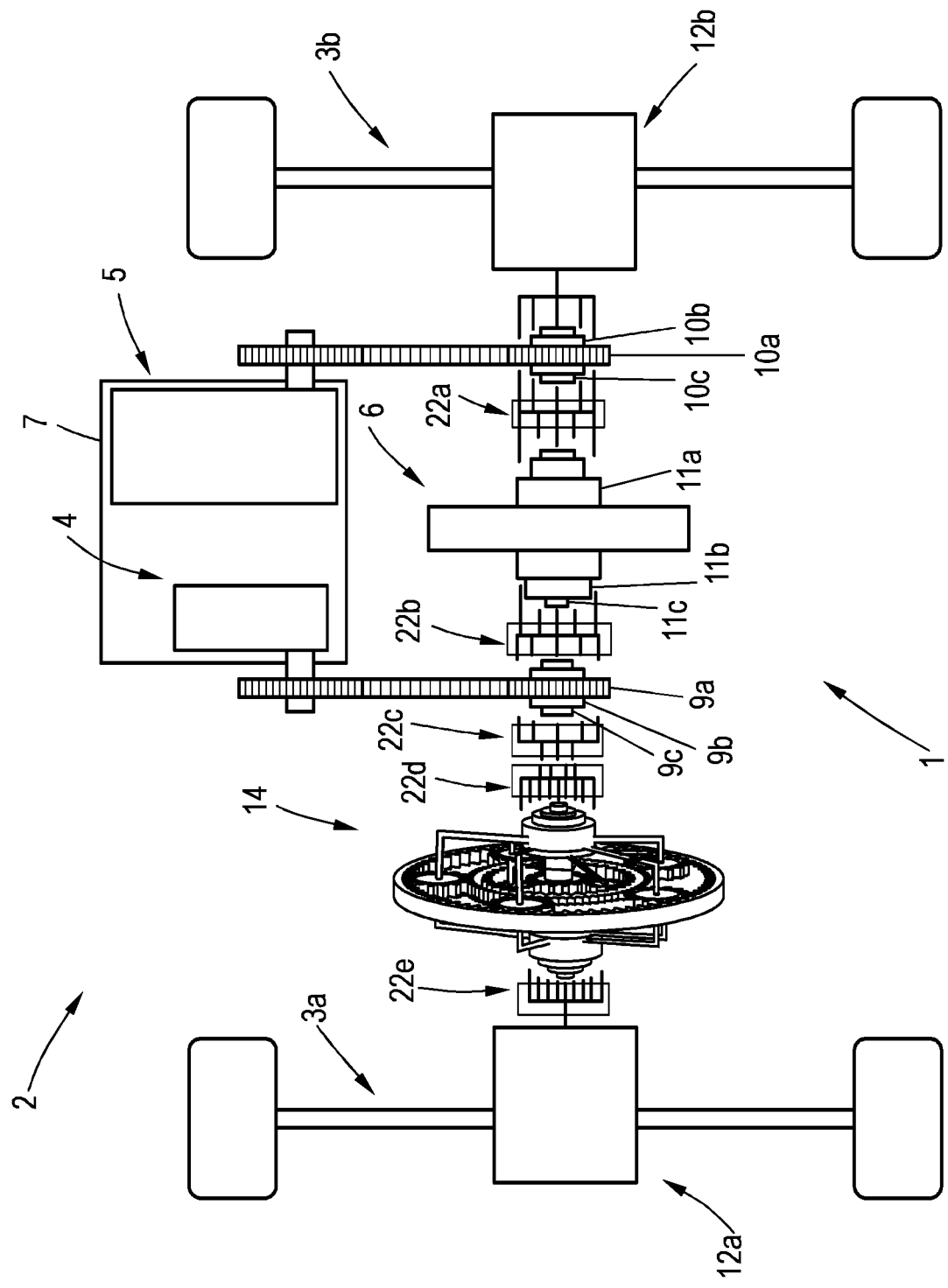
FIGS. 3-9 each of the figures shows a schematic representation of a motor vehicle according to an embodiment.

The drive apparatus 1 of the embodiment shown according to FIG. 3 includes in addition to the drive apparatuses 4-6 equipped with respective 9a-9c, 10a-10c, 11a-11c, a transmission 14 in the form of a multi-stage planetary drive, a drive device 12a that is or can be coupled to a drivable front axle 3a on the side of the motor vehicle, and several coupling device 22a-22e. It will be also explained in the following section that the examples below apply analogously to a motor vehicle 2 provided with a rear axle or a rear drive. This embodiment is provided for a motor vehicle 2 with a front axle drive. As will be additionally also explained in the following, the embodiments are analogously applicable to a motor vehicle 2 having a rear axle or rear drive. The possible torque paths or output paths are indicated by full lines.

A first coupling device 22a is adapted for coupling a drive element 10a-10c of the second drive device 5 to at least one drive element 11a-11c of the third drive device 6 and for decoupling at least one drive element 10a-10c of the second drive device 5 from at least one drive element 11a-11c of the third drive device 6. As can be seen from the figure, the first coupling device 22a is connected between the third drive device 6 and the second drive device 5.

In a motor vehicle 2 provided with a rear axle or rear drive, the first coupling device 22a would be configured for coupling a drive element 9a-9c of the first drive device 4 to at least one drive element 11a-11c of the third drive device 6, and for decoupling at least one drive element 9a-9c of the first drive device 4 from at least one drive element 11a-11c of the third drive device 6. Accordingly, the first coupling device 22a would be connected between the third drive device 6 and the first drive device 4.

A second coupling device 22b is adapted for coupling at least one drive element 9a-9c of the first drive device 4 to at least one drive element 10a-10c of the second drive device 55 and/or at least one drive element 11a-11c of the third drive device 6, and for decoupling at least one drive element 9a-9c of the first drive device 4 from at least one drive element 10a-10c of the second drive device 5 and/or at least one drive element 11a-11c of the third drive device 6. As one can see, the second coupling device 22b is connected between the third drive device 6 and the first drive device 4.

In a motor vehicle 2 provided with a rear axle or rear drive, the second coupling device 22b would be adapted for coupling at least a first drive element 10a-10c of the second drive device 5 to at least one drive element 9a-9c of the first drive device 4 and/or at least one drive element 11a-11c of the third drive device 6, and for decoupling at least one drive element 10a-10c of the second drive device 5 from at least one drive element 9a-9c of the first drive device 4 and/or at least one drive element 11a-11c of the third drive element 6. Accordingly, the second coupling device 22b would be connected between the third drive device 6 and the second drive device 5.

A third coupling element 22c is provided for coupling at least one drive element 9a-9c of the first drive device 4 and/or at least one drive element 10a-10c of the second drive device 5 and/or at least one drive element 11a-11c of the coupled coupling element of the third drive device (not shown) of the third coupling device 22 to at least one coupling element (not shown) of a fourth coupling device 22d connected upstream on the drive side of the transmission device 14, and for decoupling a coupling element of the third coupling device 22c coupled to at least one drive element 9a-9c of the first drive device 4 and/or at least one drive element 10a-10c of the second drive device 5 and/or at least one drive element 11a-11c of the third drive device 6 of the coupling element of the third coupling device 22c from at least one coupling element of the fourth coupling device 22 connected upstream on the drive side. The third coupling device 22c is connected between the first drive device 4 and the fourth coupling device 22d upstream of the transmission device 14 on the drive side.

In a motor vehicle 2 provided with a rear axle or rear drive, the third coupling device 22c would be also adapted for coupling a coupling element of the third coupling device 22c of a drive device 4 with at least one drive element 9a-9c and/or at least one drive element 10a-10c of the second drive device 5 and/or at least one drive element 11a-11c of the third drive device 6 to at least one coupling element of the transmission device 14 connected upstream of the (rear) drive of the fourth coupling element 22d, and also for decoupling of the first drive device 4 provided with at least one drive element 9a-9c and/or the second drive device 5 with at least one drive element 10a-10c and/or the third drive device 6 provided with at least one drive element 11a-1cc from the coupled coupling element of the third coupling device 22c from at least one coupling element of the drive device (14) (rear) connected upstream to the fourth coupling device 22d on the drive side. The third coupling device 22c would be connected between the second drive device 5 and the upstream connected fourth coupling device 22d connected to the transmission device 14 (rear) on the drive side.

The fourth coupling device 22d connected upstream of the or a drive apparatus 14 is adapted for coupling the coupling element (not shown) of the first drive device 4 with at least one drive element 9a-9c and/or the second drive device 5 with at least one drive element 10a-10c and/or a third drive device 6 with at least one drive element 11a-11c of the coupling element (not shown) of the third coupling device 22c of the fourth coupling device 22d to at least one rotatable gear element on the drive side (not shown) of the transmission device 14, and for decoupling of at least one coupled coupling element of a drive device 4 with at least one drive element 9a-9c and/or of the second drive device 5 with at least one drive element 10a-10c and/or the third drive device 6 with at least one drive element 11a-11c from the coupled element of the third coupling device 22c of the fourth coupling device 22d from at least one rotatable gear element on the drive side of the gear device 14. The fourth coupling device 22d is connected between the third coupling device 22c and the transmission device 14.

In a motor vehicle 2 provided with a rear axle or rear drive, the fourth coupling device would be also adapted for coupling the fourth coupling device 22d to at least one drive element 9a-9c of the first drive device 4 and/or at least one drive element 10a-10c of the second drive device 5 and/or at least one drive element 11a-11c of the third drive device 6 coupled with the coupling element of the third coupling device 22c of the fourth coupling device 22d to at least one (rear) drive-side rotatable gear element of the gear device 14, and for decoupling of the coupling element of the first drive device 4 with at least one drive element 9a-9c and/or the second drive device 5 with at least one drive element 10a-10c and/or the third drive device 6 with at least one drive element 11a-11c coupled with the coupling element of the fourth coupling device 22d from at least one (rear) side rotatable gear element of the gear device 14. The fourth coupling element 22d would be also connected between the third coupling device 22c and the gear device 14.

A fifth coupling device 22e is adapted for coupling at least one output-side rotatable gear element (not shown) of the gear device 14 that is or can be coupled to the front axle 3a drivable on the side of the vehicle, and for decoupling of at least one gear element of the gear device 14 on the output side from at least one output element of the output device 1a that is or can be coupled with the front axle 3a drivable on the vehicle side. The fifth coupling device 22e is connected between the gear device 14 and the output device 12a.

In a motor vehicle 2 provided with a rear axle or rear drive, the fifth coupling device 22e would be adapted for coupling at least one drive-side rotatable gear element of the gear device 14 to at least one drive element of the output device 12b that is or can be coupled to the rear axles drivable on the side or the motor vehicle, and for decoupling at least one gear element of the gear device 14 rotatable on the output side from at least one output element of the rear axle 3b that is or can be coupled to the rear axle 3b. The fifth coupling device 22e would be connected between the gear element 14 and the output device 12b.

By means of a corresponding arrangement and configuration of the embodiment of the drive apparatus 1 shown in FIG. 3, five coupling devices 22a-22e can be realized as described with any required combinations of all rotatable drive elements 9a-9c, 10a-10c, 11a-11c and output element 13 with all rotatable gear elements and thus with a maximum variability in the drivetrain of the motor vehicle 2 equipped with the drive apparatus 1.

Figure 4:
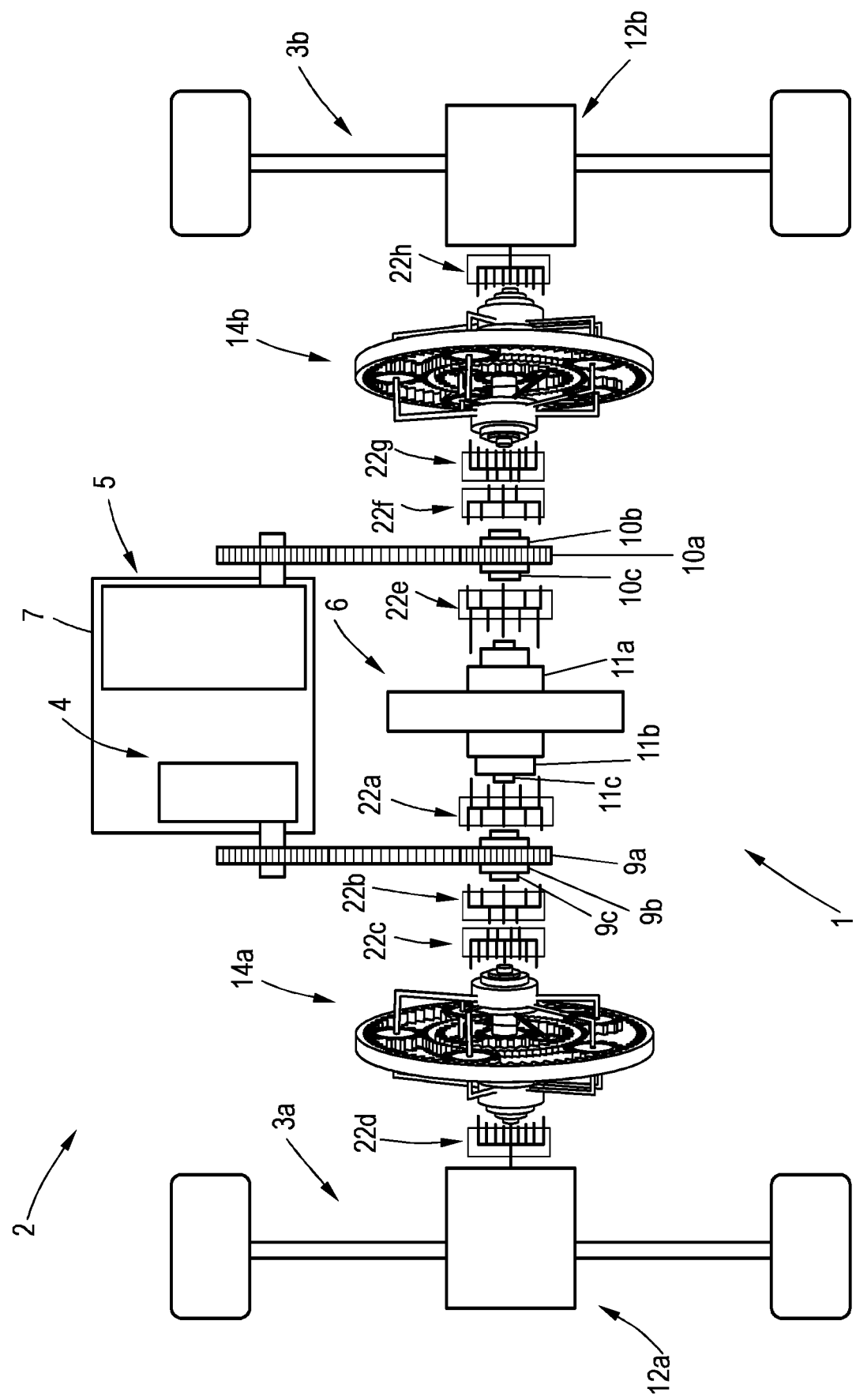

The drive apparatus 1 shown in FIG. 4 also comprises the three drive devices 4-6, and not one, but two gear devices 14a, 14b designed as multi-stage planetary gears that are or can be coupled to at least a front axle 3a drivable on the side of the motor vehicle, an output device 12b that is or can be coupled to the rear axle 3b drivable on the side of the motor vehicle, and several coupling device 22a-22h. The drive apparatus 1 shown in FIG. 4 is provided with a front axle or front drive and/or with a rear axle or rear drive. Such a motor vehicle 2 can be driven either via the front axle 3a or via the rear axle 3b, or—in the case of an all-wheel drive—can be driven both with the front axle 3a and also with the rear axle 3b. Similarly to FIG. 3, possible torque and output paths are indicated by solid lines.

A first coupling device 22a is adapted for coupling at least one drive element 9a-9c of the first drive device 4 to at least on drive element 10a-10c of the second drive device 5 and/or at least one drive element 11a-11c of the third drive device 6, and for decoupling of at least one drive element 9a-9c of the first drive device 4 from at least one drive element 10a-10 of the second drive element 5 and/or at least one drive element 11a-11c of the third drive device 6. The first coupling device 22a is connected between the third drive device 6 and the first drive device 4.

A second coupling device 22b is provided for coupling a coupling element (not shown) of a first drive device 4 with at least one drive element 9a-9c and/or the second drive device 5 with at least one drive element 10a-10c and/or the third drive device 6 with at least one drive element 11a-11c of the second coupling device 22b to at least one coupling element (not shown) of a second coupling device 22b to at least one coupling element 14a of a coupling device 22c connected on the (front) drive-side, and for decoupling of the first drive device 4 with at least one drive element 9c and/or the second drive device 5 with at least one drive element 10a-10c and/or the third drive device 6 with at least one drive element 11a-11c of the coupled coupling element of the second coupling device 22b from at least one coupling element of the first gear device 14a of the third coupling element 22c connected upstream of on the (front) drive side of the first gear device 14a. The second coupling device 22b is connected between the first drive device 4 and a third coupling device 22c connected on the (front) drive side upstream of the first gear device 14a.

The third coupling device 22c connected upstream on the (front) drive side of or a first gear device 14a is adapted for coupling a first drive device 4 with at least one drive element 9a-9c and/or the second drive device 5 with at least one drive element 10a-10c and/or the third drive device 6 with at least one device element (not shown) of the second coupling device 22b coupled with the coupling element (not shown) of the third coupling device 22c with a least one (front) drive-side rotatable gear element (not shown) of the first gear device 14a, and for decoupling of the first drive device 4 with at least one drive device 9a-9c and/or the second device 5 with at least one drive element 10a-10c and/or the third drive device 6 with at least one drive element 11a-11c coupled with the coupling element of the second coupling device 22b coupled with the coupling element of the third coupling element 22c of at least one drive-side rotatable gear element of the first gear device 14a. The third coupling device 22c is connected between the first device 4 with at least one drive element 9a-9c and/or the second device 5 with at least one drive element 10a-10c and/or the third device 6 with at least one drive element 11a-11c coupled with the coupling element of the second coupling device 22b and the first gear device 14a.

A fourth coupling device 22s is connected for coupling at least one output-side rotatable gear element (not shown) of the first gear device 14a to at least one drive element (not shown) which is or can be coupled to at least one output element (not shown) of an output device 12a that is or can be coupled to the front axle 3a drivable at the side of the motor vehicle, and for decoupling at least one drive-side rotatable gear element of the first gear device 14a from at least one gear element of the output device 12a that is or can be coupled with the front axle 3a drivable on the side of the motor vehicle. The fourth coupling device 22d is connected between the first gear device 14a and the output device 12a that is or can be coupled to the first drivable front axle 12a.

As is evident from the text below, the arrangement and the configuration of the four coupling devices 22a-22d described above is symmetrical in the other described coupling devices 22e-22h with respect to the drive device 6.

A fifth coupling device 22e is connected for coupling at least one drive element 10a-10c of the second drive device 5 to at least one drive element 9a-9c of the first drive device 4 and/or at least one drive element 11a-11c of the third drive device 6, and for decoupling at least one drive element 19a-19c of the second drive device 5 from at least one drive element 9a-9c of the first drive device 4 and/or at least one drive element 11a-11c of the third drive device 6. The fifth coupling device 22e is arranged between the third drive device 6 and the second drive device 5.

As can be seen from the figure, the fifth coupling device 22e and the first coupling device 22e are arranged symmetrically with respect to the drive device 6.

A sixth coupling device 22f is adapted for coupling with at least one drive element 9a-9c of the first drive device 4 and/or at least one drive element 10a-10c of the second drive device 5 and/or at least one drive element 11a-11c of the third device 6 coupled with a coupling element (not shown) of the fifth coupling device 22e with at least one coupling element (not shown) of the seventh coupling device 22g connected upstream of the second gear device 14b, and for decoupling of the first drive device 4 with at least one drive element 9a-9c and/or at least one drive element 10a-10c of the second drive device 5 and/or at least one drive element 11a-11c of the third drive 6 coupled with the coupling element of the sixth coupling device 22f from at least one coupling element of the second gear device 14b of the seventh coupling device 22g connected upstream on the (rear) drive side. The sixth coupling element 22f is arranged between the second drive device 4 and the seventh coupling device 22g connected upstream of the second drive apparatus 14b on the (rear) drive side. As can be seen from the figure, the sixth coupling device 22f and the second 22b are arranged symmetrically with respect to the third drive device 6.

The or a sixth gear device 22f is arranged upstream of the seventh coupling device 22g on the (rear) drive-side for coupling the first drive device 4 with at least one drive element 9a-9c and/or the second drive device 5 with at least one drive element 10a-10c and/or the coupling element (not shown) of the third drive device 6 with at least one drive element 11a-11c to the coupling element (not shown) of the sixth coupling device 22g with at least one rotatable gear element on the side of the drive (not labeled) of the second gear device 14b, and for decoupling the first drive device 4 with at least one drive element 9a, 9c and/or at least the second drive device 5 with at least one drive element 10a-10c and/or the coupling element of the third drive device 6 with at least 11a-11c coupled with the coupling device 22f of the coupling element 22g from at least one (rear) drive side rotatable gear element of the second gear device 14b. The seventh coupling device 22g is arranged between the coupling element of the first drive device 4 with at least one drive element 9a-9c and/or the second drive device 5 with at least one drive element 10a-10c and/or the third device 6 with at least one drive element 11a-11c coupled to the coupling device 22f and the second gear device 14b. As one can see from the figure, the seventh coupling device 22g and the third coupling device 22c are arranged symmetrically with respect to the third drive device 6.

Finally, an eighth coupling device 22h is adapted for coupling at least one (rear) drive side rotatable gear element (not shown) of the second gear device 14b to at least one drive element (not shown) of the output device 12b that is or can be coupled to the rear axle 3b drivable on the side of the motor vehicle, and for decoupling at least one output side rotatable gear element of the second gear device 14b from at least one drive element of the output device 12b which is or can be coupled to the rear axle drivable on the side of the vehicle. The eighth coupling device 22h is connected between the second gear device 14b and the output device 12b which is or can be coupled to the drivable rear axle 3b. As one can see from the figure, the eighth coupling device 22h and the fourth coupling device 22d are arranged symmetrically with respect to the third drive device 6.

With a corresponding arrangement and configuration of the eight coupling devices 22a-22h of the embodiment of the drive apparatus 1 shown in FIG. 4, any of the combinations mentioned above can be realized as required with all rotatable drive elements 9a-9c, 10a-10c, 11a-11c and the drive element 13 and with all the gear elements, so that a maximum variability can be achieved in the drivetrain of the motor vehicle 2 equipped with the drive apparatus 1.

In corresponding coupling states of the coupling devices 22a-22h, a driving output can be applied via the first drive device 4 and/or via the second drive device 6 and/or via the third drive device 6, and therefore through individual, multiple, or all drive devices 4-6, so that a driving power can be applied to the drivable front axle 3a and/or the drivable rear axle 3b. In view of a particularly consumption-efficient operating mode or operating type, in particular in the context of a current or future target variable, in particular a current or future target speed or target acceleration of the motor vehicle 2 equipped with the drive apparatus 1, the driving power can this be applied in certain operating situations, in particular driving situation, via the first drive device, i.e. the first internal combustion engine which is comparatively "smaller", optionally in addition to the third drive device 6, i.e. the electric motor, or via the second drive device 5, i.e. the comparatively "larger" second internal combustion engine, optionally in addition to the driving power applied via the third drive device 6, i.e. the electric motor, or via the first drive device 4, i.e. the first internal combustion engine which is comparatively "smaller", and the second drive device 5, i.e. the second internal combustion engine which is comparatively "larger", optionally in addition to the driving power that is applied via the third drive device 6, i.e. the electric motor, to the drivable front axle 3a and/or to the drivable rear axle 3b.

The drive apparatus 1 can further comprise a control device, which is adapted to divide or distribute the driving power from respective drive device 4-6 that is available or can be made available under certain circumstances on the side of the coupling elements at least partially to the different drive axles of the motor vehicle 2 equipped with the drive apparatus 1. Therefore, the corresponding drive outputs that are available or can be made available can be divided or distributed to the drivable front axle 3a and/or to the drivable rear axle 3b with a division or distribution of the driving power implemented for division or distribution to a front drive or to a rear drive, or to a mixed front and rear drive with a specified division or distribution of the drive output to the front axle 3a and the rear axle 3b of the motor vehicle 2 equipped with the drive apparatus 1.

The embodiments above are explained in more detail in different configuration possibilities of the drive apparatus 1 in the embodiments shown in FIGS. 5-8. The embodiments of the respective configurations shown in FIGS. 5-8 correspond to the configuration of the embodiment shown according to FIG. 4.

Figure 5:
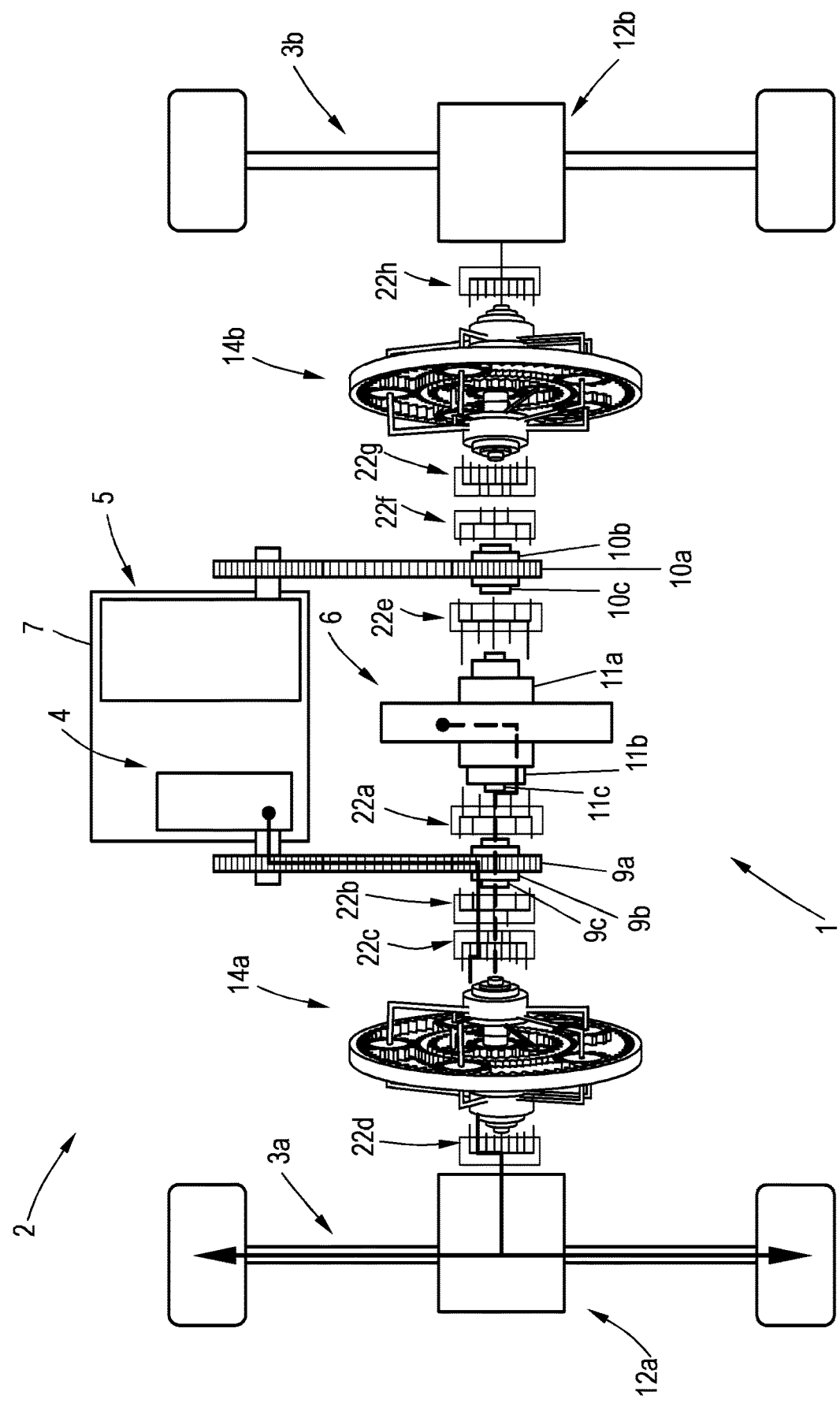

The embodiment shown in FIG. 5 is an example illustrating a particularly energy-efficient or consumption-efficient drive with a reduced emission of the motor vehicle 2 provided with the drive apparatus 1. The driving of the motor vehicle 2 is carried out only via the front axle 3a. As indicated by the arrow, the drive output is provided via the first drive device 4, which is to say by the comparatively "smaller" internal combustion engine, and/or via the third drive device 6, which is to say by the electric motor. A purely electric drive of the motor vehicle 2 can be also provided. The drive output can be controlled by regulating the rotational speed of the first drive device 4 and/or of the third drive device 6. Different torques or output paths can be realized via the coupling device 22a-22d and the gear device 14a, so that a comparatively wide range of speeds can be obtained.

Figure 6:
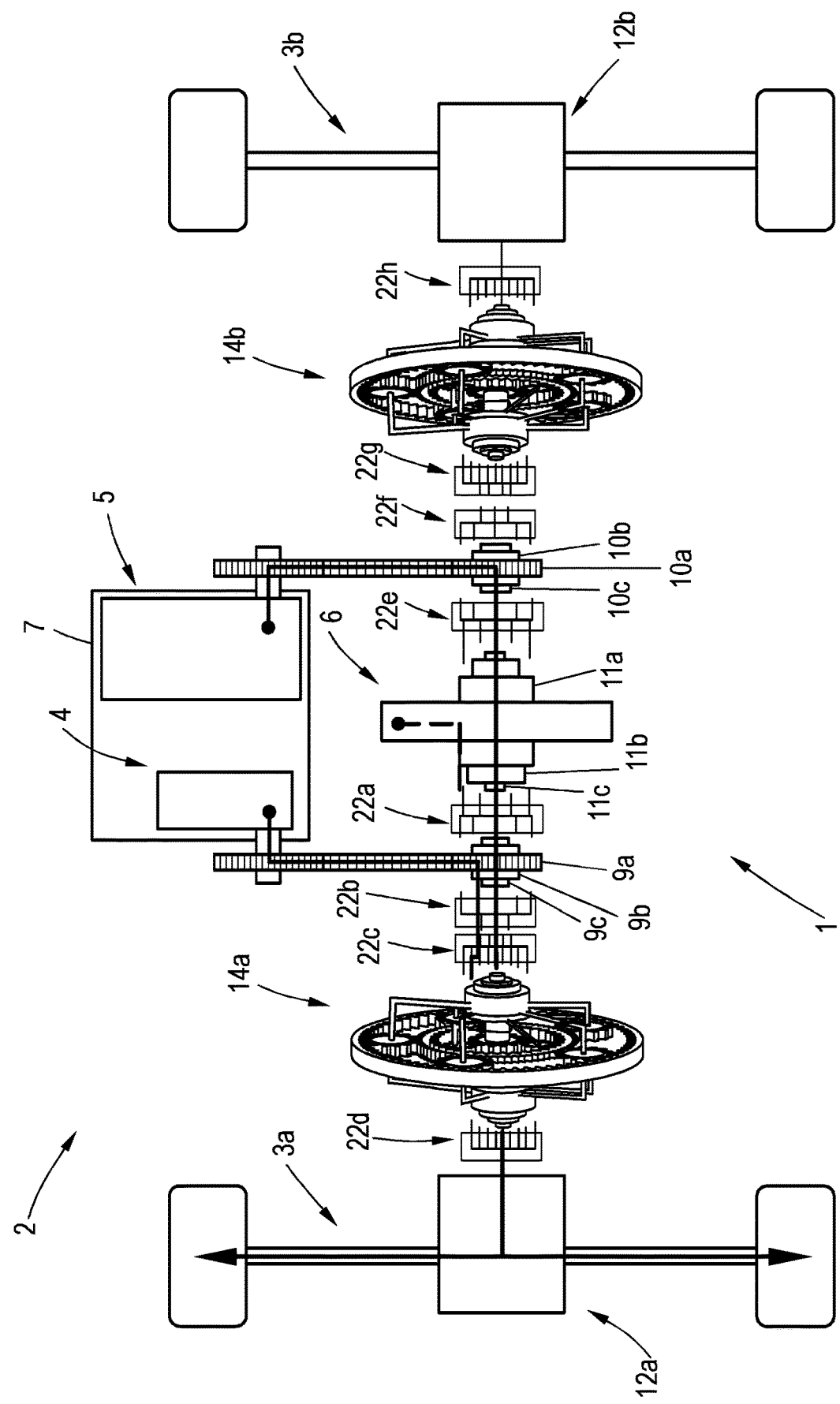

The embodiment shown in FIG. 6 is an example illustrating a configuration of the drive apparatus 1 of a motor vehicle 2 equipped with the drive apparatus 1 that is provided for higher load situations. The driving operation of the motor vehicle 2 is again carried out only via the front axle 3*a*. As indicated by the arrows, the drive output is provided by the first drive device 4, which is to say by the comparatively "smaller" internal combustion engine, and by the second drive device 5, which is to say the comparatively "larger" internal combustion engine, and optionally in addition also by the third drive device 6, which is to say the electric motor. The drive output can be controlled by controlling the rotational speed of the first drive device 4, of the second drive device 5, and optionally also of the third drive device 6. Similarly to the embodiment shown in FIG. 5, different torques and output paths can be realized with the coupling devices 22*a*-22*e* and the gear device 14*a*, so that a comparatively wide range of speeds can be obtained.

Figure 7:
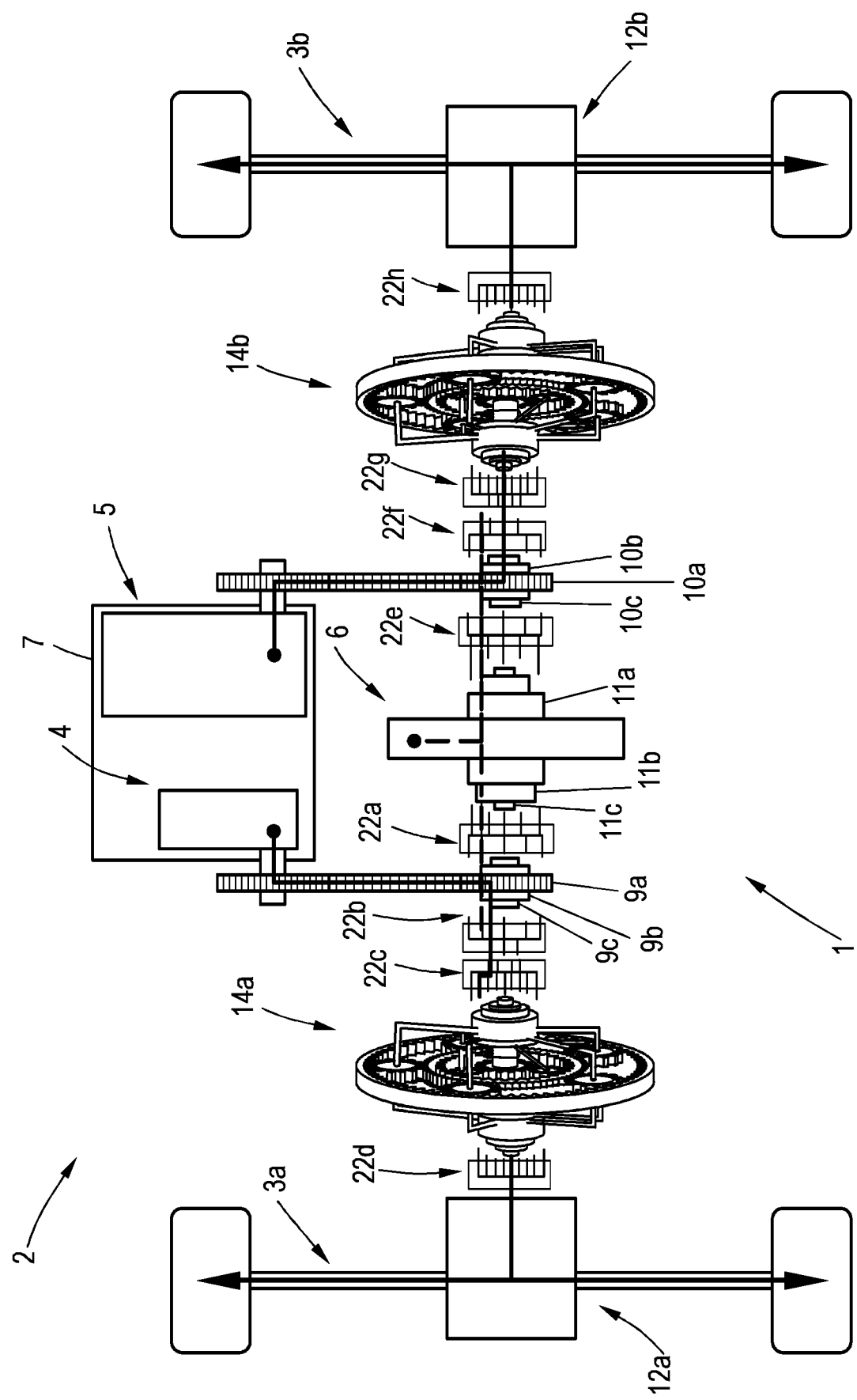

In the embodiment shown in FIG. 7 is illustrated an example of a configuration of the drive device 1 of the motor vehicle 2 equipped with the drive apparatus 1 that is provided for a maximum acceleration. The driving operation of the motor vehicle 2 is carried out both via the front axle 3*a* and also via the rear axle 3*b*. As indicated by the arrows, the drive output is provided to the front axle 3*a* via the first drive device 4, which is to say with the comparatively "smaller" internal combustion engine, and additionally also via the third drive device 6, which is to say the electric motor. The drive output applied to the rear axle 3*b* is provided with the second drive device 5, which is to say the comparatively "larger" internal combustion engine, and optionally in addition also via the third drive device 6, which is to say the electric motor. The drive output can be controlled by regulating the rotational speed of the first drive device 4, of the second drive device 5 and of the third drive device 6. Different torques and output paths can be realized via the coupling device 22*a*-22*h* and the gear devices 14*a*, 14*b*, so that a comparatively wide range of speeds can be again obtained.

Figure 8:
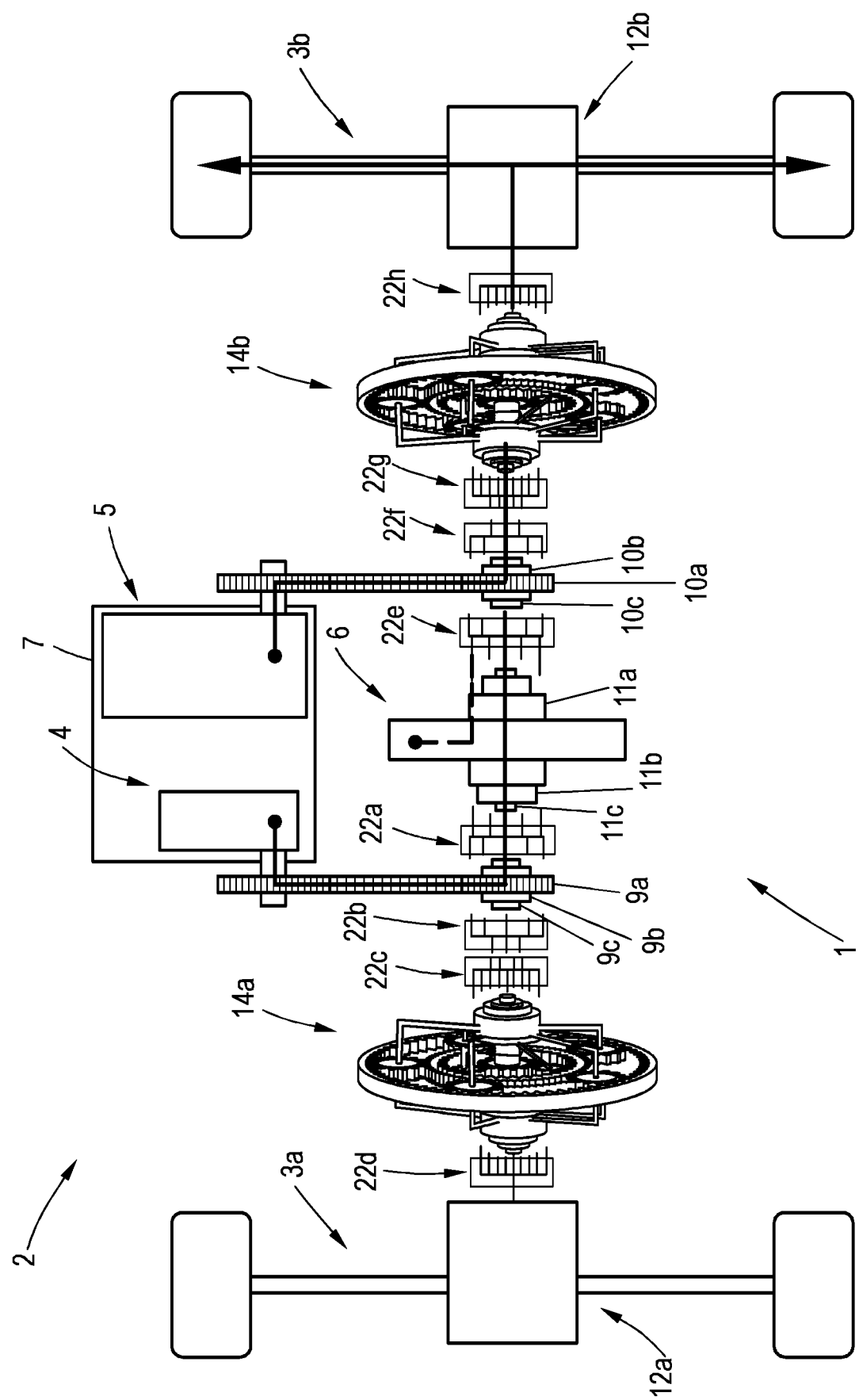

The embodiment shown in FIG. 8 is an example illustrating the configuration of a motor vehicle 2 provided with a drive device 1 for a sport-type of the operation of the motor vehicle. The driving operation of the motor vehicle 2 is carried out here only via the rear axle 3*b*. As indicated by the arrows, the drive output applied to the rear axle 3*b* is provided by the first drive device 4, which is to say the comparatively smaller internal combustion engine, by the second drive device 5, which is to say the comparatively "larger" internal combustion engine, and (optionally) in addition also via the third drive device 6, which is to say the electric motor. The drive output can be controlled via regulating the rotational speed of the first drive device 4, of the second drive device 5 and of the third drive device 6. Different torque and output paths can be realized with the coupling devices 22*a*, 22*e*-22*h* and the gear device 14*b*, so that a comparatively wide range of speeds can be again obtained.

Figure 9:
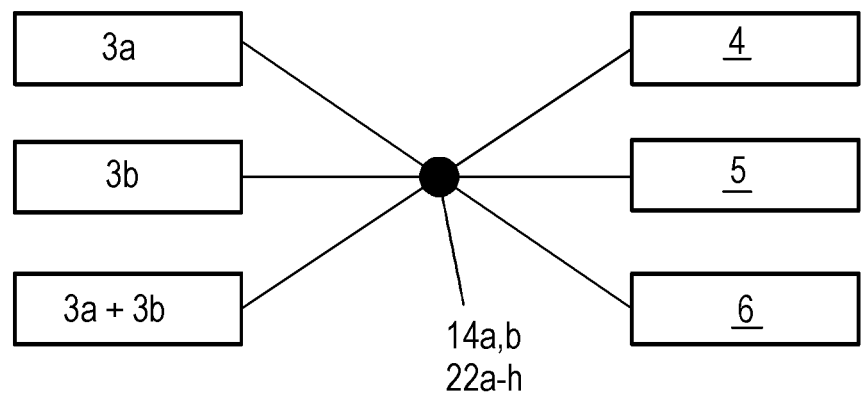

As shown in a general overview of the principle illustrated in FIG. 9, it is evident in what manner the individual, multiple, or all of the drive devices 4-6 can be coupled with the or with a drivable front axle 3*a* and/or with the or with a drivable rear axle 3*b*.

It should be also noted that at least one of the drive devices 4-6 can be assigned to a shift transmission device (not shown) comprising a plurality of shifting stages. In this case, a control device can be configured to supply the drive output provided before a shifting operation with the drive device 4-6 by one of the drive devices 4-6 via at least one other drive device 4-6. Smooth switching can be realized in this manner, which is provided through the connected drive devices 4-6 so that the actually applied traction force will be applied at the time of switching process of these drive devices 4-6, which is to say in particular during the switching operation, via at least one other drive device 4-6.

The invention claimed is:

1. A drive apparatus for a motor vehicle, comprising:
a first, a second, and a third motor drive device,
a first and a second gear device,
a front output device that is coupled or can be coupled to a drivable front axle of the motor vehicle,
a rear output device that is coupled or can be coupled to a drivable rear axle of the motor vehicle, and
a plurality of coupling devices, wherein:
a first coupling device is adapted for coupling and decoupling a first at least one drive element of the first motor drive device to and from at least one of a second at least one drive element of a second drive device and a third at least one drive element of a third motor drive device;
a second coupling device is adapted for coupling and decoupling at least one of the first at least one drive element of the first motor drive device, the second at least one drive element of the second motor drive device, and the third at least one drive element of the third motor drive device to and from a coupling element of the second coupling device;
the second coupling device is further adapted for coupling and decoupling the coupling element of the second coupling device to and from a coupling element of a third coupling device;
the third coupling device is arranged upstream of and coupled to an input side of the first gear device;
the third coupling device is adapted to couple and decouple a first at least one rotatable input gear element of the first gear device to and from a coupling element of the third coupling device;
the third coupling device is further adapted to couple and decouple the coupling element of the third coupling device with the coupling element of the second coupling device;
a fourth coupling device is adapted for coupling and decoupling a first at least one rotatable output gear element of the first gear device to and from the front output device;
a fifth coupling device is adapted for coupling and decoupling the second at least one drive element of the second motor drive device to and from at least one of the first at least one drive element of the first motor drive device and the third at least one drive element of the third motor drive device;
a sixth coupling device is adapted for coupling and decoupling at least one of the first at least one drive element of the first motor device, the second at least one drive element of the second motor device, and the third at least one drive element of the third motor drive device to and from a coupling element of the sixth coupling device;
the sixth coupling device is further adapted for coupling and decoupling the coupling element of the sixth coupling device to and from a coupling element of a seventh coupling device;
the seventh coupling device is arranged upstream of and coupled to an input side of the second gear device;
the seventh coupling device is adapted to couple and decouple a second at least one rotatable input gear element of the second gear device to and from the coupling element of the seventh coupling device;

the seventh coupling device is further adapted to couple and decouple the coupling element of the seventh coupling device to and from the coupling element of the sixth coupling device;

an eighth coupling device is adapted for coupling and decoupling a second at least one rotatable output gear element of the second gear device to and from the rear output device.

2. The drive apparatus according to claim 1, wherein the first second, and third motor drive devices have, at least in one specified rotational speed range, different torque and output characteristic curves.

3. The drive apparatus according to claim 1,
wherein the first, second, and third motor drive devices are coupleable and decoupleable through at least one of the first and the second gear device to the output device, such that the drive devices are operated or can be operated based on a target variable determined from a current or future operating mode of the motor vehicle equipped with the drive apparatus.

4. The drive apparatus according to claim 3, wherein a coupling and decoupling state of the first, second, and third drive devices are configured in view of an optimal torque and efficiency level calculated from a torque and output characteristic curve for each of the first, second, and third motor drive devices.

5. The drive apparatus according to claim 1, wherein the first and second motor drive devices are each configured as an internal combustion engine, wherein the internal combustion engine forming the first motor drive device and the internal combustion engine forming the second drive device have at least one of:
an equal or unequal number of cylinders;
an equal or unequal stroke; and
an equal or unequal bore ratio.

6. The drive apparatus according to claim 5, wherein the internal combustion engine forming the first motor drive device and the internal combustion engine forming the second drive device form internal combustion engine parts of an internal combustion motor unit comprising at least two internal combustion engine motor parts.

7. The drive apparatus according to claim 6, wherein internal combustion engine forming the first motor drive device and the internal combustion engine forming the second drive device are assigned to a combustion chamber of an internal combustion engine unit enclosed with a cylinder head.

8. The drive apparatus according to claim 1, wherein at least one of the first and the second gear device is formed as at least a one-stage or a multi-stage planetary gear, wherein the planetary gear comprises as rotatable elements at least one sun wheel, at least one planetary gear with a number of planetary wheels, and at least one ring wheel.

9. The drive apparatus according to claim 8, wherein the at least one coupling device is adapted to at least one of:
couple the first at least one rotatable drive element of the first motor drive device to the at least one sun wheel or the at least one planetary carrier or the or at least one ring wheel,
decouple the first at least one rotatable drive element of the first motor drive device from the at least one sun wheel or the at least one planetary carrier or the at least one ring wheel,
couple the second at least one rotatable drive element of the second drive device to the at least one sun wheel or at least one planetary carrier or the at least one ring wheel,
decouple the second at least one rotatable drive element of the second drive device from the at least one sun wheel or the at least one planetary carrier or the at least one ring wheel,
couple the at least one rotatable gear element of at least one of the first and the second gear device to the at least one sun wheel or the at least one ring wheel, and
decouple the at least one rotatable gear element of at least one of the first and the second gear device from the at least one sun wheel or the at least one planetary carrier of the at least one ring wheel.

10. The drive apparatus according to claim 1, further comprising a control device, which is configured to distribute drive outputs that are generated or can be generated by the first, second, and third motor drive devices in certain coupling and decoupling states of the at least one coupling device so as to be partially distributed to different drive axles of a motor vehicle equipped with the drive apparatus.

11. The drive apparatus according to claim 1, wherein at least one of the first, second, and third motor drive devices are assigned to a gear shifting device comprising multiple shifting stages, wherein a control device is configured to compensate for drive output lost while a first drive device is undergoing a shifting operation with drive output provided by the second and/or third drive device.

12. The drive apparatus according to claim 1, wherein the first and second motor drive devices are configured as internal combustion engines, wherein the internal combustion engines are jointly associated with internal combustion engine-specific auxiliary aggregate components selected from: starter devices, pump devices, drive means, electric generators, turbo chargers or compressor devices.

13. A drive apparatus for a motor vehicle, comprising:
a first, a second, and a third motor drive device,
a gear device,
at least one output device that is coupled or can be coupled to at least a drivable axle of the motor vehicle, and
a plurality of coupling devices, wherein:
a first coupling device is adapted for coupling and decoupling a first at least one drive element of the first motor drive device to and from a third at least one drive element of the third motor drive device;
a second coupling device is adapted for coupling and decoupling a second at least one drive element of a second motor drive device to and from at least one of the first at least one drive element of the first motor drive device and the third at least one drive element of the third motor drive device;
a third coupling device is adapted for coupling and decoupling at least one of the first at least one drive element of the first motor drive advice, the second at least one drive element of the second motor drive device, and the third at least one drive element of the third motor drive device to and from a coupling element of the third coupling device;
the third coupling device is further adapted for coupling and decoupling the coupling element of the third coupling device to and from a coupling element of a fourth coupling device;
the fourth coupling device is arranged upstream of and coupled to an input side of the gear device;
the fourth coupling device is adapted for coupling and decoupling at least one rotatable gearing element of the gear device to and from the coupling element of the fourth coupling device;

the fourth coupling device is further adapted for coupling and decoupling the coupling element of the fourth coupling device to and from the coupling element of the third coupling device; and a fifth coupling device is adapted for coupling and decoupling the at least one rotatable gear element of the gear device to and from the at least one output device.

\* \* \* \* \*